US010367400B2

(12) United States Patent
Head et al.

(10) Patent No.: US 10,367,400 B2
(45) Date of Patent: Jul. 30, 2019

(54) LINE START PERMANENT MAGNET MOTOR USING A HYBRID ROTOR

(71) Applicant: COREteQ Systems Ltd., Bagshot (GB)

(72) Inventors: Philip Head, Virginia Water (GB); Hassan Mansir, Maidenhead (GB)

(73) Assignee: Coreteq Systems Ltd., Surrey (GB)

( * ) Notice: Subject to any disclaimer, the term of this patent is extended or adjusted under 35 U.S.C. 154(b) by 51 days.

(21) Appl. No.: 15/036,152

(22) PCT Filed: Nov. 17, 2014

(86) PCT No.: PCT/EP2014/074806
§ 371 (c)(1),
(2) Date: May 12, 2016

(87) PCT Pub. No.: WO2015/071469
PCT Pub. Date: May 21, 2015

(65) Prior Publication Data
US 2016/0294269 A1    Oct. 6, 2016

(30) Foreign Application Priority Data

Nov. 15, 2013 (GB) .................................. 1320247.8

(51) Int. Cl.
*H02K 21/46* (2006.01)
*H02K 5/132* (2006.01)
(Continued)

(52) U.S. Cl.
CPC ............. *H02K 21/46* (2013.01); *H02K 1/276* (2013.01); *H02K 5/132* (2013.01); *H02K 7/003* (2013.01); *H02K 16/00* (2013.01); *H02K 17/165* (2013.01)

(58) Field of Classification Search
CPC ........ H02K 1/276; H02K 7/003; H02K 21/46; H02K 17/165
See application file for complete search history.

(56) References Cited

U.S. PATENT DOCUMENTS 1,469,304 A   10/1923  Hughes
1,960,484 A    5/1934  Ekstromer
(Continued)

FOREIGN PATENT DOCUMENTS

CN   101227127 A1   7/2008
CN   101873043 A    10/2010
(Continued)

OTHER PUBLICATIONS

G2 Consult: "Theory & Practice of Electromagnetic Design of DC Motors & Actuators", Internet, Nov. 16, 2012, retrieved from the Internet Jan. 22, 2016: URL: https://web.archive.org/web/20120116070129/http://www.consult-g2.com/course/chapter8/chapter.html ; 5 pgs.
(Continued)

*Primary Examiner* — Dang D Le
(74) *Attorney, Agent, or Firm* — Fay Sharpe LLP

(57) ABSTRACT

A rotor system for a downhole motor comprises a set of permanent magnets, a set of conductors and a pair of end conductor rings connecting the set of conductors. The set of permanent magnets and the set of conductors being substantially coaxial and having the substantially the same linear extent. The set of permanent magnets can be located radially inwards from the set of conductors, and may be provided by discrete conductive bars.

10 Claims, 3 Drawing Sheets

(51) Int. Cl.
  *H02K 7/00* (2006.01)
  *H02K 17/16* (2006.01)
  *H02K 1/27* (2006.01)
  *H02K 16/00* (2006.01)

(56) References Cited

U.S. PATENT DOCUMENTS

| | | | |
|---|---|---|---|
| 2,240,569 A | | 5/1941 | Myers |
| 2,531,120 A | * | 11/1950 | Feaster .............. E21B 4/04 173/79 |
| 2,781,465 A | * | 2/1957 | Schuff .............. H02K 17/165 310/210 |
| 4,631,435 A | * | 12/1986 | McCarty .............. H02K 21/46 310/156.57 |
| 5,682,074 A | | 10/1997 | Di Pietro et al. |
| 5,952,757 A | * | 9/1999 | Boyd, Jr. .......... B22D 19/0054 310/156.81 |
| 6,710,498 B1 | * | 3/2004 | Lee .............. H02K 15/0012 310/211 |
| 2002/0066568 A1 | | 6/2002 | Buchanan |
| 2002/0079763 A1 | | 6/2002 | Fleshman et al. |
| 2008/0238235 A1 | * | 10/2008 | Takahashi .......... H02K 21/46 310/156.78 |
| 2009/0184598 A1 | | 7/2009 | Nakano |
| 2011/0316468 A1 | | 12/2011 | Makki et al. |

FOREIGN PATENT DOCUMENTS

| | | |
|---|---|---|
| DE | 102011120985 A1 | 6/2013 |
| EP | 2112748 A1 | 10/2009 |
| EP | 2573908 A2 | 3/2013 |
| GB | 2438493 A | 11/2007 |
| GB | 2501352 A | 10/2013 |
| JP | S57186966 A | 11/1982 |
| JP | H05 22916 A | 1/1993 |
| JP | H11 299144 A | 10/1999 |
| JP | 2009095193 A | 4/2009 |
| WO | WO2004027211 A1 | 4/2004 |
| WO | WO2015/071468 A3 | 5/2015 |
| WO | WO2015071465 A1 | 5/2015 |
| WO | WO2015071466 A2 | 5/2015 |
| WO | WO2015071470 A1 | 5/2015 |

OTHER PUBLICATIONS

International Search Report and Written Opinion, PCT/EP2014/074806, Completed May 28, 2015, dated Jun. 10, 2015, 11 pages.

* cited by examiner

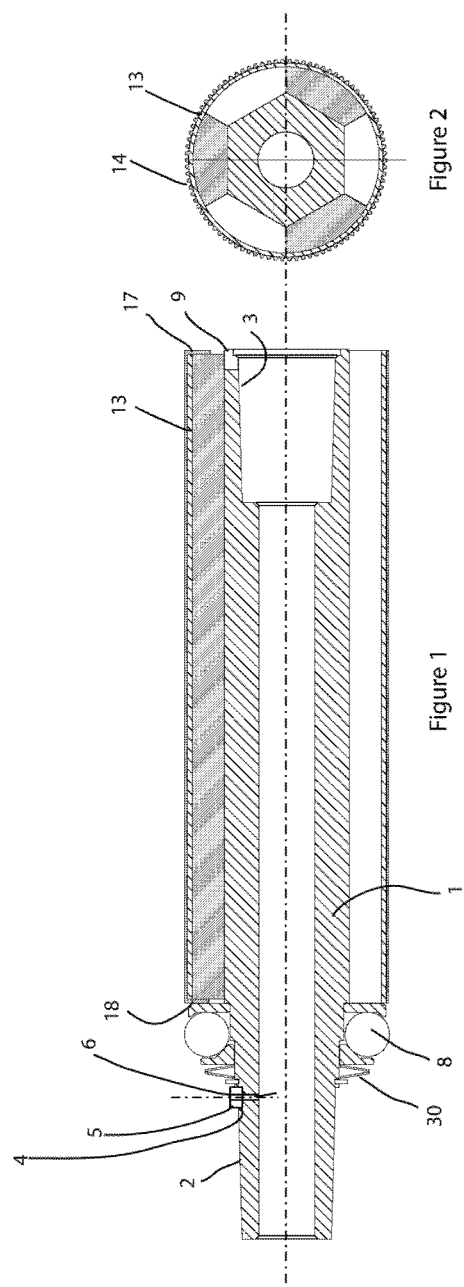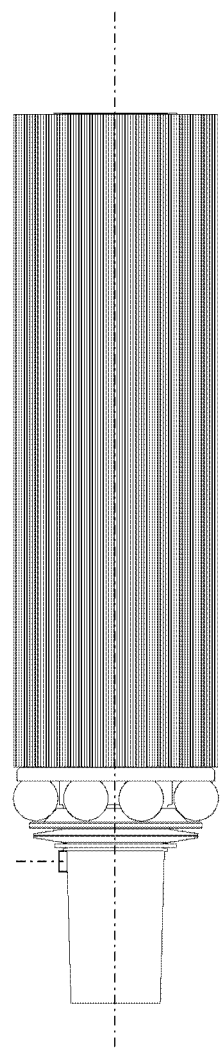

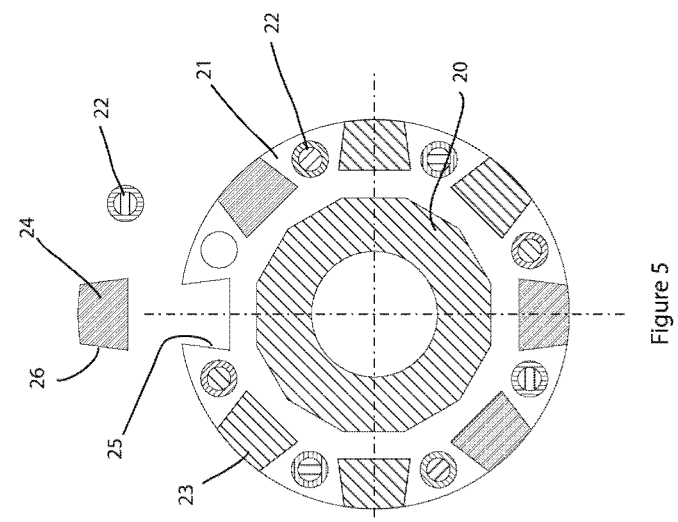
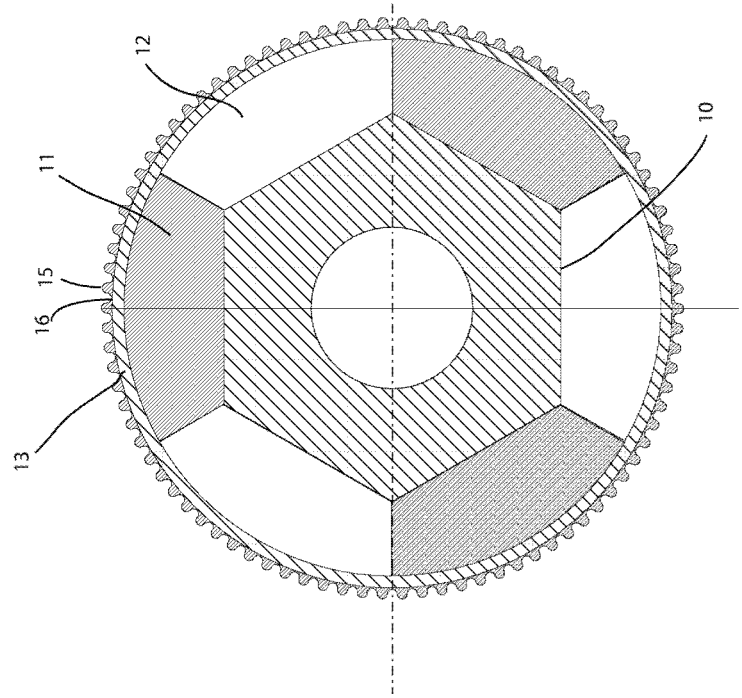

US 10,367,400 B2

LINE START PERMANENT MAGNET MOTOR USING A HYBRID ROTOR

CROSS-REFERENCE TO RELATED APPLICATIONS

This application is a National Stage Entry of PCT/EP2014/074806, and claims priority to, and the benefit of, Great Britain Patent Application No. GB 1320247.8, filed Nov. 15, 2013, the entirety of which is hereby incorporated by reference as if fully set forth herein.

TECHNICAL FIELD

This invention relates to electric motors, and more particularly, to a permanent magnet motor and induction motor combination that is capable of self-starting when operated directly on line.

BACKGROUND ART

Permanent magnet motors are typically unable to operate without elaborate controls because they cannot be started when connected directly to the line. Thus, they typically employ rotor position transducers and control electronics in order to start. These components quite clearly add to both the cost and the complexity of the motor system, also in a wellbore environment they are more susceptible to damage and have to communicate with the controlled over a very long cable, which is both expensive because of the long cable but also introduces sometime delays due to the many thousands of feet between the motor controlled and the motor.

As one means of avoiding position transducers and control electronics, while providing for a direct on-line starting performance, squirrel cage rotors and magnets may be employed on a rotor surface, so that the rotor of the motor can be made in to include both the functions of an induction rotor this can then act as a starter, while the permanent magnets once synchronised provide the efficiencies and power density.

The benefit of this combination is that the induction motor rotor portion is able to get the rotor turning in the correct direction and once the permanent magnet rotor portion is in synchronisation no power is absorbed by the induction motor and all the efficiency benefits of the permanent magnet motor are realised. However, such an arrangement is complex and bulky.

It is therefore the objective of this invention to have a rotor that can be simply started in a convenient, compact and versatile arrangement.

According to the invention, there is provided a rotor system for a downhole motor comprising a set of permanent magnets, a set of conductors, a pair of end conductor rings connecting the set of conductors, the set of permanent magnets and the set of conductors being substantially coaxial and having the substantially the same linear extent.

Having the combined characteristics of an induction rotor and permanent magnet rotor characteristics, such a system may be started on line, or with a simple drive. The system can be started without requiring complex control, and towards synchronous speed the permanent magnet motor takes over, and once at speed will operate synchronous with the supply frequency. Thus, the efficiency of the permanent magnet motor is increased to achieve significant energy saving over an equivalent induction motor.

Once at synchronous speed the induction rotor portion will generate zero torque and consume minimum power. If the permanent magnet rotor losses synchronisation, the induction portion of the rotor will generate torque and enable the system to regain synchronisation.

The motor can therefore be run on direct line, and may be operated with a simple variable speed drive.

For long motors as used in the oil industry for submersible pumps it is advantageous both for cost and easy of manufacture to construct the rotor in short sections and connect together. It is also possible to make a hybrid rotor, combining features of an induction rotor and a permanent magnet rotor. The benefit of this combination is that the induction characteristics enable the rotor turning in the correct direction and once the permanent magnet characteristics are in synchronisation no power is absorbed by the induction rotor portion, thus all the efficiency benefits of the permanent magnet motor are realised, and none of the drawbacks and similarly, all the benefits of an induction motor are enjoyed again without the draw backs.

By way of example the following figures will be used to describe embodiments of the invention.

FIG. 1 is a section side view of a hybrid solid body with a conductive outer surface combined with permanent magnet rotor.

FIG. 2 is a end section view AA of the rotor shown in FIG. 1

FIG. 3 is a side view of FIG. 1

FIG. 4 is exploded view of FIG. 2

FIG. 5 is a section end view of a further embodiment of the invention, showing a hybrid rotor combining a squirrel cage with permanent magnets.

Figure 7:
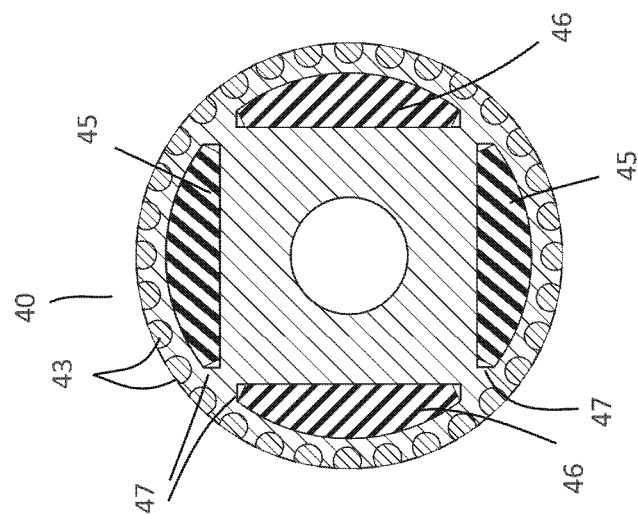
FIG. 7 is the same view as FIG. 6 with four internal breadloaf cross sections filled with magnets N,S,N,S and the external surface profiles filled with copper rods swaged to be permanently part of the rotor. These copper rods could also be copper clad steel if used in a high temperature application.

Referring to FIGS. 1 to 4, there is shown a hybrid motor, which combines an outer conductive surface induction rotor combined with permanent magnet located beneath this layer.

Referring to FIGS. 1 and 2, there is shown a longitudinal section and cross section of a first module 32 of a rotor, combining an outer conductive surface induction rotor system 33 combined with permanent magnet system 34 located beneath this layer.

The rotor shaft 1 at one end has a male Morse taper 2 and the other a female Morse taper 3. At the base of the male Morse taper 2 is a small countersunk hole 4 in which a small pin 5 is inserted, held by an interference fit. The rotor includes a central through bore 35. A small hole 6 in the pin 5 allows oil to flow from the inner bore 35 of the shaft 6 via a hole 7 in the shaft, to outside the shaft adjacent to the shaft bearing 8 to lubricate the rotor.

Several rotor modules 32 can be joined together to increase the length, and thus the output power, of the motor. Adjacent rotor modules are similarly provided with male and female Morse tapers, so that each male Morse taper of one rotor module mates with the female Morse taper of an adjacent Morse taper. Morse tapers are cones and tapers with a low gradient, such that when male and female tapers are fitted together with sufficient force, the interference fit and friction between the surface secure the parts together, remaining joined even when some axial separation force is applied, and also a torsional locking. keyways or splines could additionally be provided on one of the tapes, which corresponding features on the other taper, so that they can key together and increase the torsional transfer capabilities.

The shaft bearing 8 is a hybrid type, employing ceramic balls which electrically isolate the shaft from the stator. The balls of the shaft bearing 8 are also energised by Bellville washers 30, so that they are pushed radially outward to have a positive interference fit with the stator bore (not shown).

At the female Morse taper 3 end of the shaft 1 is a small slot 9 which is the same width as the diameter of the pin 5, as the shafts are pushed together this provides perfect shaft alignment, and additional torque transfer capability above that provided by the of the Morse taper.

During manufacture, flats 10 are machined onto the surface of the rotor shaft 1 to give it a hexagonal section, and north polarised magnets 11 and south polarised magnets 12 are bonded to these surfaces. A thin wall outer steel tube 13 encases the magnets to retain the magnets when the shaft is rotating.

The outer surface 14 is composed of copper, which is longitudinally fluted or undulating, alternating from a thick section or peak 15 to a thin section or trough 16. This is achieved by cold drawing the rotor through a die which has the undulating profile around the full 360 degree circumference of the rotor.

The fluted, corrugated or rippled outer conductive layer 14 acts in a similar way to longitudinal conductors, the thin sections offering a relatively high resistance and inhibiting radial current.

An alternating current flowing in a stator winding (not shown) produces a magnetic field which rotates in relation to the stator. This magnetic field cuts or pierces the rotor construction in a transverse direction, perpendicular to the rotor axis. As the magnetic flux cuts the rotor construction, it induces during its rotation a voltage in the conductive coating 14. This generates an electric current in the conductor of the rotor construction, this electric current in the rotating magnetic field applies a torque, and the rotor starts to rotate.

In effect this operates in the same way as the squirrel cage, the key difference being a far simpler and cost effective construction.

Referring to FIG. 5 there is shown another embodiment of the invention. The rotor shaft 20 is made from a shaft having a hexagonal section, laminations 21 having corresponding apertures are fitted over this shaft, and a copper ring (not shown) at each end of the lamination stack. Copper clad steel bars 22 pass through the lamination stack and are swaged or welded to the copper end rings (not shown). This is provides a squirrel cage type arrangement.

North pole permanent magnets 23 (by convention the magnets are distinguished by the pole facing radially outwards) and south pole permanent magnets 24, are dove tail shaped 26, and are slid into the dove tail slot 25 of the lamination. The slot retains the magnet when the rotor is spinning at the required speed. It also enables easy installation of the magnets into the rotor. The magnets are also in compression, so even at high centrifugal speed are not subject to tensile failure.

The squirrel cage acts to get the rotor turning, and when the permanent magnets get the rotor into synchronous speed with the rotating filed in the stator, no slip will be experienced by the squirrel cage and no torque will be generated.

Figure 6:
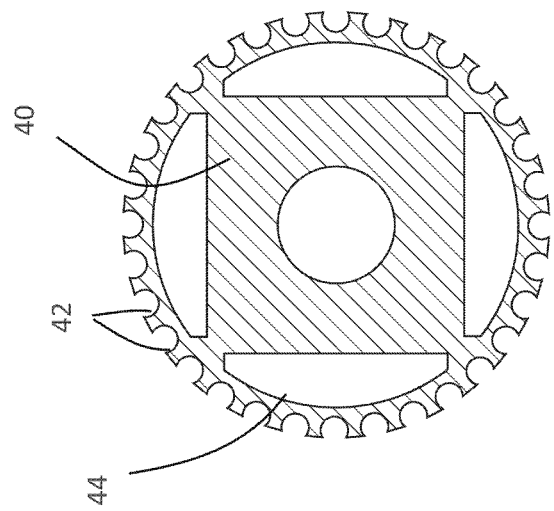
FIG. 6 is a section end view of a solid rotor with internal cut always and external surface features.

Referring to FIGS. 6 and 7, another method of forming the rotor is from a solid piece of material to form the rotor body 40, which may be formed for example by electric discharge machining or wire eroded to the section or profile shown. This machining method is only possible as the rotor lengths may be relatively short, and built up in a modular manner as described.

Around the circumference of the external profile, are included a series of crescent-shaped notches 42, which each have the excised shaped of the major segment of a circle. Copper rods or copper clad steel rods 43, having a slightly smaller diameter than that of the inner diameter of each notch 42, is axially slid into these notches, and then the outer surface of the rotor is swaged, so that the segment of each copper rod 43 which protrudes from the notch is swaged so that the rod fills the notch and is secured in it. Any excess copper can be machined off to leave the outer surface of the rotor circular. Each end of the rotor terminates in end rings which to form a closed electric circuit with the rods 43, to which they are ultrasonically welded.

The rotor body also includes four cavities 44, each approximately the shape of a minor segment. A pair of north pole magnets 45 and two sets of south pole magnets 46 are each have corresponding segment-shaped sections, are inserted into the cavities. A small air gap at each side of the magnet to enhance the magnet performance.

The invention claimed is:

1. A rotor system for a downhole motor comprising:
    a set of permanent magnets;
    a set of conductors comprising discrete conductive bars; and
    a pair of end conductor rings connecting the set of conductors;
    the set of permanent magnets and the set of conductors being substantially coaxial and having the substantially the same linear extent;
    the set of permanent magnets and the set of conductors both being set in a rotor body, the rotor body having an outermost outer surface, the outermost outer surface featuring notches in which the conductors are set; and
    a conductive material substantially formed around a cylinder, the thickness of the conductive material varying around the radius of the cylinder in an alternating manner, so as to provide relatively thick portions that are generally axially aligned.

2. A rotor system according to claim 1 wherein the set of permanent magnets are located radially inwards from the set of conductors.

3. A rotor system according claim 2 wherein the permanent magnets are set in axial cavities formed inside the rotor body.

4. A rotor system according to claim 1 wherein the discrete conductive bars are set in curved axial notches formed on the outermost outer surface of a rotor body.

5. A rotor system according to claim I wherein the conductive bars are set in notches having a dovetailed section formed on the outermost outer surface of a rotor body.

6. A rotor system according to claim 1 wherein the permanent magnets are set in notches having a dovetailed section formed on the outermost outer surface of a rotor body.

7. A rotor system according to claim 1 wherein a through bore is included.

8. A plurality of rotors according to claim 1, joined in series by a connection.

9. A plurality of rotors according to claim 8 wherein the connection comprises a male self lock taper on one rotor, and a corresponding female self lock taper on the other rotor.

10. A rotor system according to claim 8 wherein the connection includes a spline or key capable of transferring torque between rotors.

\* \* \* \* \*